Jan. 11, 1938.     F. O. SUFFRON     2,105,017
MEANS FOR METERING FLUID FLOW
Filed May 27, 1936     2 Sheets-Sheet 1
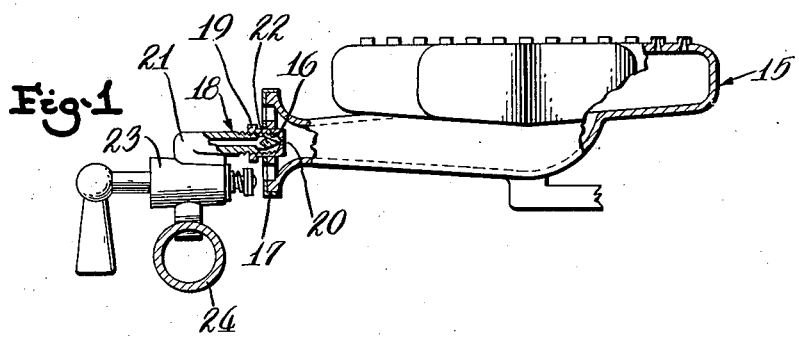
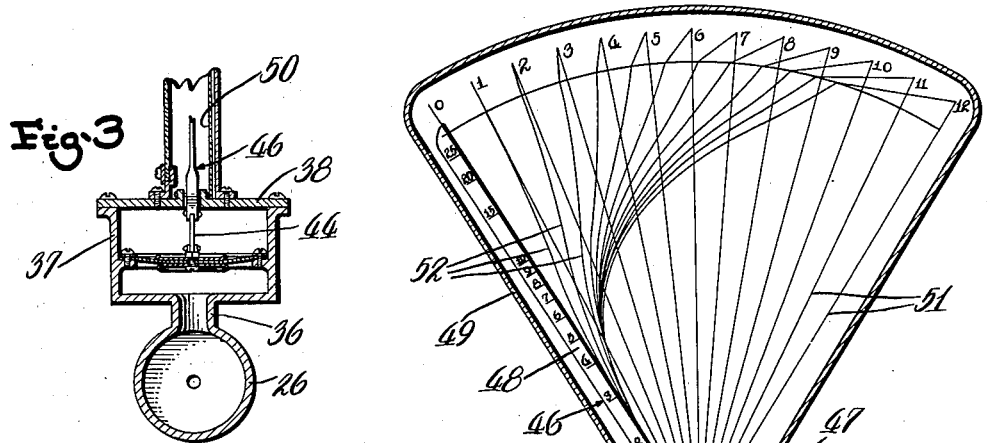
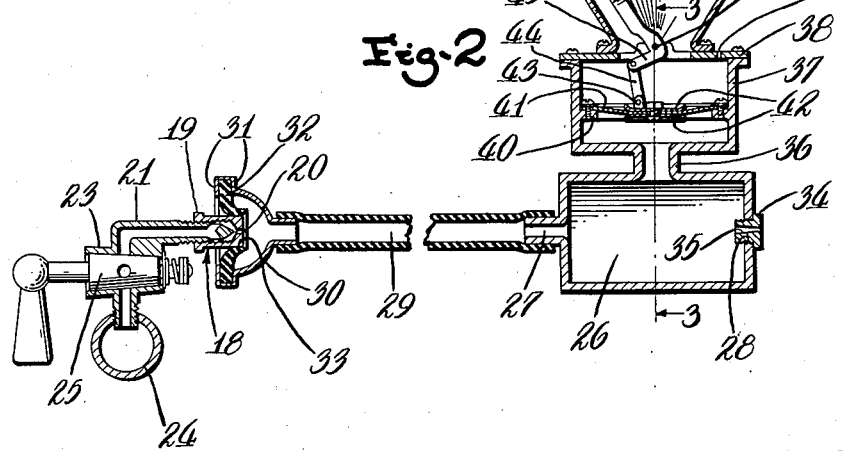
Fay O. Suffron
INVENTOR

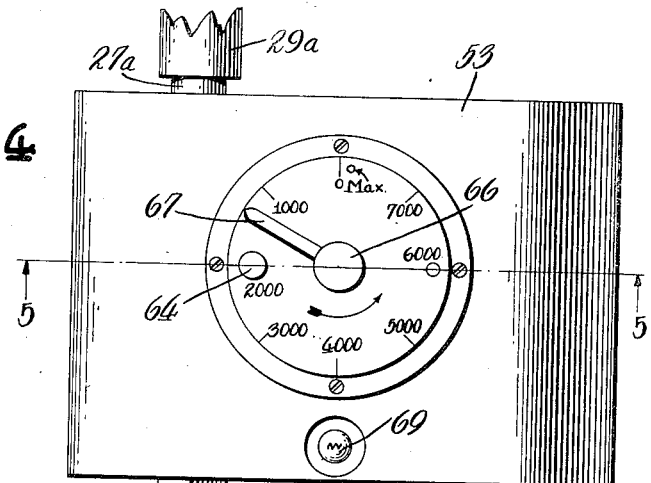
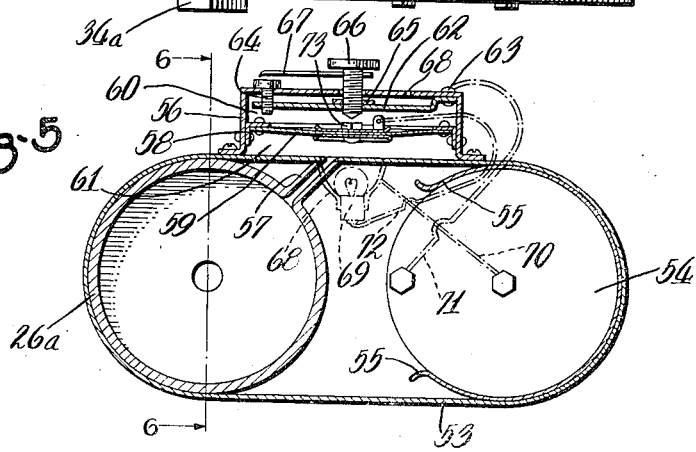
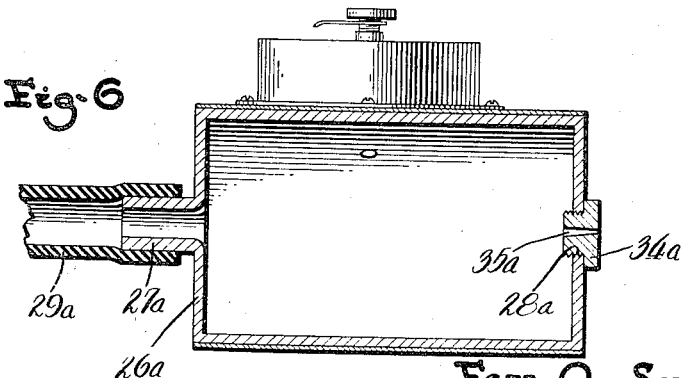

Patented Jan. 11, 1938

2,105,017

UNITED STATES PATENT OFFICE 2,105,017

MEANS FOR METERING FLUID FLOW

Fay O. Suffron, Cleveland, Ohio, assignor to American Gas Association, Incorporated, New York, N. Y., a corporation of New York Application May 27, 1936, Serial No. 82,040

10 Claims. (Cl. 73—194)

This invention relates to means for metering fluid flow, more particularly to devices for measuring fluid flow to a mechanism actuated by or consuming such fluid, and the principal object of this invention is to provide new and improved means of these types.

In the drawings accompanying this specification and forming a part of this application, I have shown, for purposes of illustration, several forms which my invention may assume, and in these drawings:

Figure 1 illustrates a burner construction with which the embodiment of my invention may be used, parts of the construction being shown in section, Figure 2 illustrates an embodiment of my invention, connected to a part of the construction shown in Figure 1, Figure 3 is a fragmentary vertical sectional view corresponding to the line 3—3 of Figure 2, Figure 4 is an elevational view illustrating a different embodiment of my invention, parts being broken away, Figure 5 is a sectional view corresponding substantially to the line 5—5 of Figure 4, and Figure 6 is a sectional view corresponding substantially to the line 6—6 of Figure 5.

This invention is particularly suitable for metering flow of fluids, such as fuel or the like, through a conduit, or to a mechanism of any suitable construction, one form of mechanism being shown as a gas burner 15 in Figure 1. The burner 15 may be of any well known construction, having a chamber, and burner openings communicating with the chamber. The burner 15 is provided with a mixing tube having a central aperture 16 and means 17 for regulating the entrance of primary air to the mixing tube.

Extending through the aperture 16 in the mixing tube is an adjustable orifice device 18, comprising a thimble 19 having a relatively small aperture 20 in its closed end, and provided with interior screw-threads at its open end. The thimble 19 is screw-threadedly received on the extremity of a conduit 21, and adjacent its extremity, the conduit 21 is provided with an integral pointed needle-valve portion 22 around which fuel may flow, the needle-valve portion 22 being cooperable with the aperture 20 in the thimble 19 to regulate the amount of fuel flowing to the burner 15. The conduit 21 communicates with a conical valve chamber 23, and the chamber 23 is provided with a tubular part which is threaded into a fuel manifold 24. Disposed within the valve chamber 23 is the usual rotatable conical valve plug 25 for regulating the flow of fuel from the manifold 24 to the conduit 21.

In the usual practice, the orifice device 18 of a mechanism, such as the burner 15 of a heating device, is roughly adjusted to generally deliver a predetermined quantity of fuel flow per unit time, but this approximate adjustment does not always correctly correspond to the advised rating of the mechanism.

One embodiment of my invention to accurately meter the quantity of fuel flowing to a mechanism, such as the burner 15, is shown in Figures 2 and 3, this embodiment comprising a chambered member 26, here shown to be generally cylindrical in form, and having one end formed with a tubular nipple 27, and the opposite end formed with a threaded opening 28. Attached to the tubular nipple 27 is one end of a flexible tube 29, the other end being connected to a generally semi-spherical hollow member 30 which is provided at its plane surface with annular clamping shoulders 31, between which is clamped the periphery of a disk 32, formed of suitable resilient material, such as rubber, the disk 32 being formed with a central opening 33 which is smaller than the outer diameter of the thimble 19 so that the disk 32 may be pressed over the thimble in fluid-tight relation.

Screw-threaded into the opening 28 of the chambered member 26 is a plug 34, having an opening 35 formed therein of a predetermined size and shape. Extending from the cylindrical portion of the chambered member 26 is a tubular neck 36, providing fluid-tight communication between the chambered member 26 and a diaphragm housing 37. The diaphragm housing 37 may be cylindrical in form as shown, and provided with an open extremity which is spanned by a closure plate 38, the latter being secured to the housing 37 by suitable fastening means, such as machine screws. Formed in the closure plate 38 is a relatively small aperture 39, the purpose of which will later be apparent.

The diaphragm housing 37, intermediate its ends, is formed with an integral inwardly extending annular shoulder 40, to which is attached, in fluid-tight relation, the periphery of a diaphragm member 41. Reinforcing plates 42 may be centrally secured to opposite sides of the diaphragm 41, and as shown in Figure 2, the top plate 42 is provided with an upwardly extending ear 43, providing a pivot for one end of a lever 44, the other end of the lever 44 being pivoted to a short arm 45 of a bell-crank lever 46. The bell-crank lever 46 is movable through a slot formed in the closure plate 38, and is pivoted to the closure plate as shown at 47, and has its long arm 48 movable within a relatively large fan-shaped casing 49, the casing 49 having its open end secured to the closure plate 38. Secured to a longitudinal wall of the casing 49 is a dial plate 50, which has indications at its upper margin to designate various pressures, readable in any suitable units, as for instance inches of equivalent water column. Passing through each of the pressure indications and through a point adjacent the pivot point of the lever 46, are generally rectilinear lines 51. Extending from the pressure indications in a direction toward the left and lower margins of the dial plate are generally curved lines 52. The lines 51 and 52 are in asymptotic relation, that is, continuation of corresponding lines would approach each other but never meet. However, for generally accurate results and for purposes of space conservation, the lines need not be extended to any great length. As shown in Figure 2, an arcuate line is drawn in spaced relation with respect to the upper extremity of the dial plate 50, this line lying generally in the path followed by the upper extremity of the long arm 48, and the useful portion of the dial is disposed intermediate this line and the pivot of the lever 44. Above this curved line, the lines 52 are extended to the corresponding line 51.

As shown in Figure 2, the long arm 48 is provided with indications starting adjacent the pivot 47 and reading upwardly, these indications designating the quantity of fuel flowing through the orifice device 18, the flow being measured in any suitable units, as for instance B. t. u. per hour. The numerals on the arm 48 represent thousands of B. t. u. flowing per hour.

To understand the invention more fully, it is here pointed out that each of the lines 52 may be plotted mathematically with respect to the lines 51 by the following general formula:

$$h_2 = \frac{Q^2}{\frac{C^2}{d} K_2^2 A_2^2 + \frac{Q^2}{h_1}}$$

where:

$h_1$ is the pressure at the source, measurable in any suitable units, $h_2$ is the pressure in the metering device, measured in the same units, $A_2$ is the area of the orifice in the metering device, $K_2$ is the coefficient of discharge for the orifice in the metering device, $d$ is the specific gravity of the fluid when the specific gravity of air is assumed to be one, $Q$ is the quantity of fluid flow per unit time, $C$ is a constant for conversion of pressure to feet of air.

It will be appreciated that the fluid flow $Q$ may be measured in terms of any suitable units, and the equation given would have to be corrected for the particular units used. For instance, to meter the flow of fuel, as herein illustrated, the flow may be measured in B. t. u. per hour, and a term I designating this flow, may be substituted for $Q$ in the equation. For illustration, and referring to the particular embodiments shown in the drawings, the equation would then read:

$$h_2 = \frac{I^2}{\frac{(CJ)^2}{d} K_2^2 A_2^2 + \frac{I^2}{h_1}}$$

where, referring to the particular embodiment shown in the drawings:

$h_1$ is the pressure in the manifold 24, in inches of equivalent water column, $h_2$ is the pressure in the chambered member 26, in inches of equivalent water column, $A_2$ is the area of the opening 35, in square inches, $K_2$ is the coefficient of discharge for the opening 35, $d$ is the specific gravity of the fuel when the specific gravity of air is assumed to be one, $J$ is the heating value of the fuel in B. t. u. per cubic foot, $I$ is the input rate of the burner 15, or other mechanism, in thousands of B. t. u. per hour, $C$ is a constant for conversion of inches of equivalent water column to feet of air.

The characteristics of the particular fluid to be metered determine the values $J$, and $d$, and for a particular type of fluid these values will be constant. The values $K$ and $A$ will be determined by the capacity of the metering device, and for a predetermined capacity, these values will be constant. For different capacities, and in some instances for particular types of fluid, the size of the opening 35 in the plug 34 may need to be changed so that the valves substituted in the formula will be proportionate. It is preferable to maintain the shape of the orifice 35 in all instances, and merely vary the size of this orifice, and to effect this variation, an adjustable orifice, similar to the orifice 18 may be used; however, inasmuch as the metering devices will be constructed to operate over a certain predetermined range, and since the characteristics of a particular type of fluid do not vary appreciably, plugs having various predetermined openings may be threaded into the screw opening 28, and only one particular plug used for a certain metering device.

From the foregoing, it will be seen that in metering a particular fluid in a general predetermined capacity range, the only variable factors will be $h_2$, $I$ or $Q$, and $h_1$. Assuming the pressure $h_1$ in the manifold to be constant for a particular instance, each of the lines 52 may be formed by assuming a certain fluid flow $I$ or $Q$, and solving the equation for the pressure $h_2$. The values for $I$ or $Q$, may then be changed so as to provide different values of $h_2$ and the series of values for $I$ or $Q$, and $h_2$ may be plotted against each other to provide points on the lines 51 through which a line 52 may be drawn. Then, to form a different line 52, the manifold pressure $h_1$ is changed, and a different series of values for $I$ or $Q$ and $h_2$ are determined, and so on for as many lines 52 as is desired.

In operation, when it is desired to adjust the orifice 18 to deliver a predetermined quantity of fuel, the mechanism communicating with the orifice 18 is removed, in this illustration the burner 15 being removed, and the hollow member 30 is substituted therefor, with the resilient disk surrounding the thimble 19 in fluid-tight relation. The valve plug 25 is then turned to open position, and in this relation it will be apparent that there will be a lower pressure in the chambered member 26 (designated in the formula as $h_2$) than there is in the manifold 24 (designated in the formula as $h_1$) because of the drop in pressure through the orifice device 18, and also, that there will be an additional drop in pressure from that in the chambered member 26 to atmospheric pressure.

With the metering device connected to the thimble 19, and with the valve plug 25 in open position, the opening 35 in the plug 34 is closed by any suitable means, as by holding a finger over the opening, and the full fluid pressure in the manifold 24 will act against the diaphragm 41 so as to move the diaphragm upwardly and thereby swing the arm 48 to the right, as viewed in Figure 2, so as to indicate the full manifold pressure on the dial plate 50. It will be appreciated that the relatively small opening 39 in the closure plate 38 will permit upward movement of the diaphragm 41. For illustrative purposes, the manifold pressure will be assumed to be six inches of equivalent water column. With this reading in mind, or properly recorded, the closure shutting off the opening 35 is removed so that fluid may flow through the opening 35, and under these conditions the arm 48 will move to the left. For illustrative purposes, it may be assumed that the arm 48 has moved to indicate one inch of equivalent water column, which will be the pressure present in the member 26, and designated in the formula as $h_2$. This shows that there is a five inch pressure drop through the orifice device 18, and a one inch pressure drop through the opening or orifice 35. Assuming that the input or fluid flow through the orifice device 18, when in normal operation, is desired to be 8000 B. t. u. per hour, the thimble 19 is manipulated, as by a suitable wrench, so as to cause the opening 20 in the thimble 19 to be moved away from the pointed portion or needle-valve 22, thereby to increase the flow of fluid through the opening 20 so as to exert a greater pressure on the diaphragm 41, and this greater pressure in turn moves the arm 48 to the right. The thimble 19 is moved relative to the needle-valve 22 until the indication 8 (meaning 8000 B. t. u. per hour) on the arm 48 is brought into register with the line 52, which relates to the line 51 extending from the indication (6) on the dial plate 50. When this registration has been effected, the orifice device 18 has been adjusted to deliver 8000 B. t. u. per hour to the burner 15 from a manifold which has a fluid pressure of six inches of equivalent water column. The metering device may then be removed from the thimble 19, and the thimble 19 connected to any suitable mechanism, such as the burner 15.

It will be apparent that any suitable form of pressure indicator may be connected to the chambered member 26, as a substitute for the pressure indicating mechanism shown in Figures 2 and 3, the pressure readings taken from the pressure indicator being supplemented by a chart on which are a series of curves formed by plotting quantities of fluid flow against pressures in the member 26, as before described. The fundamental principles in both cases are the same, and for sake of convenience and efficiency it is preferred to use a metering device such as shown in Figures 2 and 3.

From the foregoing, it will be apparent that the metering device hereinbefore described, in its broadest aspects, provides means for changing the quantity of fluid flowing from a source to a different quantity, and providing means actuated by the different quantity, the actuated means being constructed and arranged to indicate the first quantity flowing from the source. In this particular instance the device described provides a resistance to the flow of fluid through the chamber 26, so that only a part of the normal fluid flow is flowing through the orifice device 18, when the metering device is in position. This resistance, it will be apparent, is the orifice 35, the area and discharge coefficient of which is known for predetermined conditions, and this additional resistance bears a proportional relationship to the adjustable area of the adjustable orifice device 18, so that by use of the metering device, the normal flow through the orifice device 18 may be predicted. It will be appreciated that the dial plate 50 and the orifice 35 bear a definite relation to each other, and to alter the capacity of the metering device, a different dial plate and related orifice must be assembled with the metering device.

Figures 4 through 6 disclose another embodiment of the invention, wherein a signalling device is operated when the correct quantity of fluid flow has been reached. This embodiment comprises a chambered member 26a, similar to the member 26, and as before, the member 26a is provided with a tubular nipple 27a, and with a threaded opening 28a which receives a plug 34a having an opening or orifice 35a. A flexible tube 29a carrying means for connection to the thimble 19 similar to the means described in the embodiment shown in Figures 2 and 3 is also provided.

The chambered member 26a is contained within a tubular housing 53 that is elongated in transverse section so as to provide for the accommodation of a battery 54 in spaced longitudinal alignment with respect to the chambered member 26a. The battery 54 may be held in position in the housing 53 by means of spring clips 55 encircling the battery. If desired, suitable cover means (not shown) may be provided to close the open ends of the housing 53.

A cup-shaped casing 56 has its open face secured, in fluid-tight relation, to the top plane surface (Figure 5) of the housing 53, and a conduit 57 establishes communication between the interior of the cup-shaped casing 56, and the interior of the chamber member 26a. Secured to the wall of the casing 56 is an annular support 58 which has a diaphragm member 59 secured thereto, separating the casing 56 into upper and lower chambers 60 and 61. In the upper chamber 60 is a spring arm 62, having its one end secured to the casing 56 as shown at 63, the arm being constructed and arranged to normally urge its free end toward the diaphragm member 59. The free end of the arm 62 is provided with a threaded aperture to accommodate the threaded portion of a shouldered screw 64, the screw 64 passing through an aperture in the top wall of the casing 56 with the shouldered portion of the screw abutting the adjacent surface of the top wall. The spring arm 62, intermediate its ends is provided with a screw-threaded portion 65 which accommodates the threaded portion of a screw 66, the top wall of the casing 56 being provided with an aperture through which the threaded portion of the screw 66 may pass. Exteriorly of the casing 56, an indicator arm 67 is attached to the screw 66, the arm cooperating with a scale, here shown to be graduated in thousands of B. t. u. flow per hour, and located on the outer surface of the top wall of the casing 56. A relatively small aperture 68 may be formed in the top wall of the casing 56 so that the upper chamber 60 is at atmospheric pressure.

A signaling device is adapted for cooperation with this embodiment, and for purposes of illustration this device may take the form disclosed in Figures 4 through 6. As shown, the housing 53, intermediate the chambered member 26a and the battery 54, is provided with reflector or receptacle means 68, best shown in dot-dash lines in Figure 5, to provide a socket for an incandescent electric lamp 69, the housing 53 being apertured adjacent the casing 56 so that the lamp 69 is visible.

One terminal of the battery 54, as shown in dot-dash lines in Figure 5, is electrically connected by a conductor 70 to the shell of the lamp 69, and the other terminal of the battery 54 is electrically connected by a conductor 71 to the spring arm 62. The center terminal of the lamp 69 is electrically connected by a conductor 72 to an ear which is integral with a reinforcing member located centrally of the diaphragm 59. Holding the reinforcing member in position, and electrically connected thereto, is a contact 73, which is aligned with the pointed extremity of the screw 66.

In operation, and with the metering device shown in Figures 4 through 6 connected to the thimble 19 of the orifice 18, the screw 66 is turned in a direction indicated by the arrow in Figure 4, until the indicator 67 abuts a stopping plug at the maximum point of the scale, this causing the screw 66 to move in a direction away from the contact 73. The valve plug 25 is then turned to open position and the orifice 35a is held closed, so that the full fluid pressure in the manifold 24 will act upon the diaphragm member 59 to move this member in an upward direction. The screw 64 is then manipulated to move the spring arm 62 and the screw 66 carried thereby toward the contact 73, until the pointed end of the screw 66 just engages the contact 73, at which point an electrical circuit will be established through the contact 73 and including the lamp 69 and the battery 54, and the lamp 69 will be energized. The metering device has now been set to manifold pressure. The closure from the opening 35a is then removed so that fluid will flow outwardly of the chambered member 26a, and the diaphragm member 59 will drop and cause the contact 73 to disengage the screw 66 and thereby interrupt the electrical circuit through the lamp 69, and the lamp will not be energized. The pressure now acting on the diaphragm 59 will represent the pressure in the manifold minus the drop of pressure through the orifice 18. The screw 66 is now manipulated so that the indicator 67 is disposed in registration with the desired B. t. u. per hour flow of fluid, and the thimble 19 is adjusted to increase or decrease the size of the opening 20 in the thimble, the opening being decreased if the lamp is lighted when the indicator 67 is set, until just before the engagement between the screw 66 and the contact 73 is broken, or the opening is increased, if the lamp is not energized, until engagement between the screw 66 and the contact 73 is effected, at which point the lamp will light. When these conditions have been fulfilled, the metering device is removed from the thimble 19 and the burner 15 is replaced, the orifice then being capable of delivering the proper amount of fluid flow per hour. The principles of predicting the normal flow of fuel through the orifice device 18 are similar to those pointed out in connection with the metering device shown in Figures 2 and 3, and further discussion is believed to be unnecessary.

It will be appreciated that the orifice interposed in the conduit may be of an adjustable nature, or a fixed nature. In some constructions, the orifice device is not adjustable, but is constructed similar to the orifice plug 34, in which case the metering device may be used to designate the quantity of fluid flowing through the fixed orifice in the plug. Of course, in this instance, if it is desired to vary the flow of fluid to a predetermined quantity, a plug having a different orifice may be substituted, or other means may be employed to vary the characteristics of the orifice.

Although the embodiments of the invention herein disclosed are shown in metering relation with a conduit which supplies gas to a burner mechanism, these embodiments may be used to meter other fluids flowing through conduits of a different construction.

It will be apparent to those skilled in the art that I have accomplished at least the principal object of my invention, and it also will be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that my invention is not limited thereto.

I claim:

1. A device for metering the quantity of fluid flowing through an orifice, comprising: means communicating with said orifice, and constructed and arranged to cause a different quantity of fluid to flow through said orifice; and means, actuated by said different quantity of fluid, constructed and arranged to indicate said first quantity of fluid flowing through said orifice.

2. A device for metering the quantity of fluid flowing through an orifice, comprising: means communicating with said orifice for causing a different quantity of fluid to flow through said orifice, said communicating means bearing a proportional relation to the characteristics of said orifice so that said different quantity of fluid flowing is proportional to said first quantity of fluid flowing; and means, actuated by said different quantity of fluid, constructed and arranged to indicate said first quantity of fluid flowing through said orifice.

3. Means for metering normal flow of fluid through an adjustable orifice, comprising: conduit means, connectable to said adjustable orifice so that fluid flowing from said adjustable orifice will flow through said conduit means; orifice means in said conduit means for changing the normal flow of fluid through said adjustable orifice, said orifice means being of a predetermined character and bearing a proportional relation to the various sizes of the adjustable orifice, so as to change the normal flow through said adjustable orifice a proportional amount; and means actuated by the changed flow of fluid, and constructed and arranged to indicate the normal fluid flow through said adjustable orifice.

4. In combination with a fluid source: a chamber, having an outlet orifice; conduit means for establishing flow of fluid from said source to said chamber; electric signal means; contact means; means whereby said contact means is adapted to control energization of said signal means; means responsive to the pressure in said chamber, and carrying a first part of said contact means; resilient means, carrying a second part of said contact means, said resilient means being adjustable relative to said first part of said contact means, and said second part of said contact means being adjustably mounted with respect to said resilient means, the adjustment of said resilient means being operable, when said outlet orifice is held closed, to effect engagement of said contact parts to cause energization of said electric signal means, and the adjustment of said second contact part being subsequently operable to effect engagement of said contact parts when said outlet orifice is opened, so as to cause energization of said electric signal means.

5. Means for metering flow of fluid from a source, comprising: conduit means, connectable to said source, so that fluid will flow from said source through said conduit means; means constructed and arranged to control the escapement of fluid from said conduit means; and indicating means communicating with said conduit means, and comprising a portion constructed and arranged to be responsive to fluid pressure in said conduit means, and comprising also relatively movable parts, one part carrying pressure unit indications, and another part carrying fluid quantity indications.

6. Means for metering the quantity of fluid flowing from a source, comprising: conduit means connected to said source, and being operable to conduct fluid from said source; means constructed and arranged to act on the entire quantity of fluid flowing through said conduit, so as to change said entire flow to a different flow; and means actuated by said different flow, constructed and arranged to indicate said first quantity of fluid flowing from said source.

7. Means for metering the quantity of fluid flowing from a source, comprising: conduit means connected to said source, and being operable to conduct fluid from said source; means, connected in series relation with said conduit means, and being constructed and arranged to cause a different quantity of fluid to flow from said source; and means actuated by said different quantity of fluid, constructed and arranged to indicate said first quantity of fluid flowing from said source.

8. Apparatus for determining the quantity of fluid which will flow through an orifice against a predetermined pressure on the discharge side of the orifice when the intake side of the orifice is supplied with fluid at a given supply pressure greater than said predetermined pressure, comprising: conduit means, connectable to the orifice, so that fluid will flow from the fluid supply through the orifice into said conduit means; means constructed and arranged so to control the escapement of fluid from said conduit means that the pressure within said conduit means is in a range from a pressure substantially above said predetermined pressure to said supply pressure; and indicating means communicating with said conduit means, and comprising a portion constructed and arranged to be operated by fluid pressure in said conduit means, and comprising also relatively movable parts, one part carrying pressure unit indicia and also carrying fluid flow graphs corresponding to said pressure indicia and representing fluid flow, for various of said given supply pressures corresponding to said pressure indicia, under predetermined conditions in said conduit means with relation to the respective pressure indicia, and the other of said parts being constructed and arranged to indicate the pressure in said conduit means by cooperation with said pressure indicia.

9. Apparatus for determining the quantity of fluid which will flow through an orifice against a predetermined pressure on the discharge side of said orifice when the intake side of said orifice is supplied with fluid at a given supply pressure, comprising: means constructed and arranged to establish auxiliary fluid pressure, on the discharge side of said orifice, in a range from said predetermined pressure to said given supply pressure; a manually operable indicator and a scale with which said indicator is cooperable; signal means; means responsive to said auxiliary fluid pressure; and means so constructed and arranged that operation of said signal means is made to depend jointly on said pressure responsive means and the position of said indicator.

10. Apparatus for determining the quantity of fluid which will flow through an orifice against a predetermined pressure on the discharge side of the orifice when the intake side of the orifice is supplied with fluid at a given supply pressure, comprising: conduit means, connected to the orifice, so that fluid will flow from the fluid supply through the orifice into said conduit means; means constructed and arranged so to control the escapement of fluid from said conduit means that the pressure within said conduit means is in a range from a pressure substantially above said predetermined pressure to said supply pressure; and indicating means communicating with said conduit means, and comprising a portion constructed and arranged to be operated by fluid pressure in said conduit means, and comprising also relatively movable parts, one part carrying pressure unit indicia and also carrying fluid flow graphs corresponding to said pressure indicia and representing fluid flow, for various of said given supply pressures corresponding to said pressure indicia, under predetermined conditions in said conduit means with relation to the respective pressure indicia, and the other of said parts carrying fluid flow indicia and being constructed and arranged to indicate the pressure in said conduit means by cooperation with said pressure indicia and to indicate the fluid flow through said conduit means when a certain one of said flow indicia coincides with a point on the fluid flow graph leading from the pressure indicium designating the given supply pressure.

FAY O. SUFFRON.